United States Patent [19]

Okamoto et al.

[11] Patent Number: 4,813,010

[45] Date of Patent: Mar. 14, 1989

[54] DOCUMENT PROCESSING USING HEADING RULES STORAGE AND RETRIEVAL SYSTEM FOR GENERATING DOCUMENTS WITH HIERARCHICAL LOGICAL ARCHITECTURES

[75] Inventors: Toshio Okamoto, Tokyo; Miwako Doi; Isamu Iwai, both of Kawasaki, Japan

[73] Assignee: Kabushiki Kaisha Toshiba, Kawasaki, Japan

[21] Appl. No.: 897,930

[22] Filed: Aug. 19, 1986

[30] Foreign Application Priority Data

Mar. 29, 1986 [JP] Japan ................. 61-72121

[51] Int. Cl.⁴ .................. G06F 3/14; G06F 7/28; G06F 13/00; G06F 15/18
[52] U.S. Cl. .................. 364/900
[58] Field of Search ... 364/200 MS File, 900 MS File, 364/300; 358/256, 305; 235/449, 454, 432

[56] References Cited

U.S. PATENT DOCUMENTS

| | | | |
|---|---|---|---|
| 4,193,119 | 3/1980 | Arase et al. | 364/900 |
| 4,358,824 | 11/1982 | Glickman et al. | 364/200 |
| 4,502,128 | 2/1985 | Okajima et al. | 364/900 |
| 4,503,515 | 3/1985 | Cuan et al. | 364/900 |
| 4,539,653 | 9/1985 | Bartlette et al. | 364/900 |
| 4,559,598 | 12/1985 | Goldwasser et al. | 364/419 |
| 4,580,218 | 4/1986 | Raye | 364/300 |
| 4,604,712 | 8/1986 | Orrhammar | 364/900 |
| 4,610,025 | 9/1986 | Blum et al. | 382/9 |

FOREIGN PATENT DOCUMENTS 2043311 3/1979 United Kingdom ............ 364/200

OTHER PUBLICATIONS

IEEE Transactions on Software Engineering, vol. SE-12, No. 3, Mar. 1986, pp. 417-435, IEEE, New York, US; G. D. Kimura et al.: "A Structure Editor for Abstract Document Objects".

*Primary Examiner*—Archie E. Williams, Jr.
*Assistant Examiner*—Robert B. Harrell
*Attorney, Agent, or Firm*—Oblon, Fisher, Spivak, McClelland & Maier

[57] ABSTRACT

A document generating system which includes an input device for inputting document data, a heading candidate extraction section for extracting, as a heading candidate, the word corresponding to the heading stored in a heading dictionary from the document data input at the input section. A heading decision section is implemented in the system for checking the heading candiate, that was extracted by the heading candidate extraction section according to a heading rule stored in a heading rule dictionary and for deciding whether the heading candidate is a heading. Also, a document architecture decision section is implemented in the system for checking the heading decided by the heading decision section according to document architecture rules stored in a document architecture rule dictionary. The architecture decision section is for determining the heading as satisfying the document architecture rule as a true heading, and the heading not satisfying the document architecture rule as being false heading.

12 Claims, 13 Drawing Sheets

```
LINE
  1    Document understanding system ⏎
  2    Okawa Taro ⏎
  3    1. Introduction ⏎
  4    Recently, natural languages are·········.
  5    ················. ⏎
  6    2. Features of system ⏎
  7    ①. Good operability ⏎
  8    ②. High recognition rate ⏎
  9    This system is ··········. ⏎
 10    3. System configuration ⏎
 11    ·················. ⏎
```

FIG. 3

| CATEGORY | | DICTIONARY ITEM |
|---|---|---|
| RESERVED HEADING WORD | | INTRODUCTION ABSTRACT ∫ |
| SYMBOL PORTION | | § ☆ ∫ |
| NUMERIC PORTION | GENERAL | 1 2 ∫ |
| | ENCIRCLED NUMERAL | ① ② ∫ |
| | ROMAN NUMERAL | I II ∫ |
| | ∫ | |
| TAIL SYMBOL | | ... ∫ |
| PUNCTUATION PORTION | | . : ∫ |
| ∫ | | |

| LINE NUMBER | ATTRIBUTE | LEVEL | HEADING PATTERN |
|---|---|---|---|
| 1 | TITLE | 1 | Null |
| 2 | AUTHOR | 1 | Null |

FIG. 6B

| LINE NUMBER | ATTRIBUTE | LEVEL | HEADING PATTERN |
|---|---|---|---|
| 1 | TITLE | 1 | Null |
| 2 | AUTHOR | 1 | Null |
| 3 | CHAPTER HEADING | 1 | [NUMERIC(GENERAL) PORTION] + [PUNCTUATION PORTION] + HEADING  ORDER 1 |

FIG. 6C

| LINE NUMBER | ATTRIBUTE | LEVEL | HEADING PATTERN |
|---|---|---|---|
| 1 | TITLE | 1 | Null |
| 2 | AUTHOR | 1 | Null |
| 3 | CHAPTER HEADING | 1 | [NUMERIC(GENERAL) PORTION] + [PUNCTUATION PORTION] + HEADING  ORDER 1 |
| 4~5 | PARAGRAPH | 1 | Null |
| 6 | CHAPTER HEADING | 1 | [NUMERIC(GENERAL) PORTION] + [PUNCTUATION PORTION] + HEADING  ORDER 2 |

FIG. 6D

| LINE NUMBER | ATTRIBUTE | LEVEL | HEADING PATTERN |
|---|---|---|---|
| 1 ~ 7 | TITLE | 1 ~ 2 | Null |
| | ITEMIZING | | [NUMERIC PORTION] + BLANK + HEADING WORD<br>ORDER 1 |
| 8 | ITEMIZING | 2 | [NUMERIC PORTION] + BLANK + HEADING WORD<br>ORDER 2 |

FIG. 6E

| LINE NUMBER | ATTRIBUTE | LEVEL | HEADING PATTERN |
|---|---|---|---|
| 1 ~ 6 | TITLE | 1 ~ 1 | Null |
| | CHAPTER HEADING | | [NUMERIC(GENERAL) PORTION] + [PUNCTUATION PORTION] + HEADING WORD<br>ORDER 2 |
| ~ 8 | ITEMIZING | 2 | [NUMERIC PORTION] + BLANK + HEADING WORD<br>ORDER 2 |
| 9 | PARAGRAPH | 1 | Null |

DOCUMENT PROCESSING USING HEADING RULES STORAGE AND RETRIEVAL SYSTEM FOR GENERATING DOCUMENTS WITH HIERARCHICAL LOGICAL ARCHITECTURES

BACKGROUND OF THE INVENTION

The present invention relates to a document processing apparatus and, more particularly, to a document processing apparatus for processing a document having a hierarchical logical architecture.

A general document is divided into a plurality of blocks, and headings are assigned to the respective blocks. Each block is further divided into subblocks and subheadings are assigned to the respective subblocks.

Headings and subheadings are constituted by short sentences such as "abstract" or "summary". In addition, heading symbols are often added to these introductory portions, such as "Chapter 1" or "Section 3", respectively.

If document data having the hierarchical architecture described above is processed by a computer, the following problem is posed. Document data is processed in units of frames of the display or of pages of the printing sheets. According to this document data processing system, both the start and end positions of the document data for a chapter to be moved elsewhere must be designated when requesting the replacing of a given chapter with another. In this case, if the document data of the given chapter is long, the screen must be scrolled many times from the designation of the start position to the end position to be designated. Screen scrolling is cumbersome and tends to result in operational errors.

When an operator drafts a document, he often wishes to refer to the previous sentences. For example, he wishes to check the contents of the previous sentences and the kinds of the previous heading symbols. In this case, he must guess the page and the position of the line which include the sentence and heading symbol to be checked, and then search the desired sentence and heading symbol. The search operation is cumbersome and document drafting efficiency is greatly degraded.

SUMMARY OF THE INVENTION

It is an object of the present invention to provide a document processing apparatus for handling documents in units of items by utilizing the logical architectures of the documents and processing them.

According to the present invention, a document processing apparatus is provided comprising a section for extracting heading candidate words according to input document lengths and the dictionary of the heading words frequently used in the document, a deciding section for determining, according to data read out from a storage for storing heading rules, whether reserved heading words are heading words, and a document architecture decision section for deciding if the heading sentence checked by the deciding section has a document logical architecture of a chapter heading, a section heading, or a paragraph according to document architecture rules stored in a document architecture rule storage.

DETAILED DESCRIPTION OF THE PREFERRED EMBODIMENT

Figure 1:
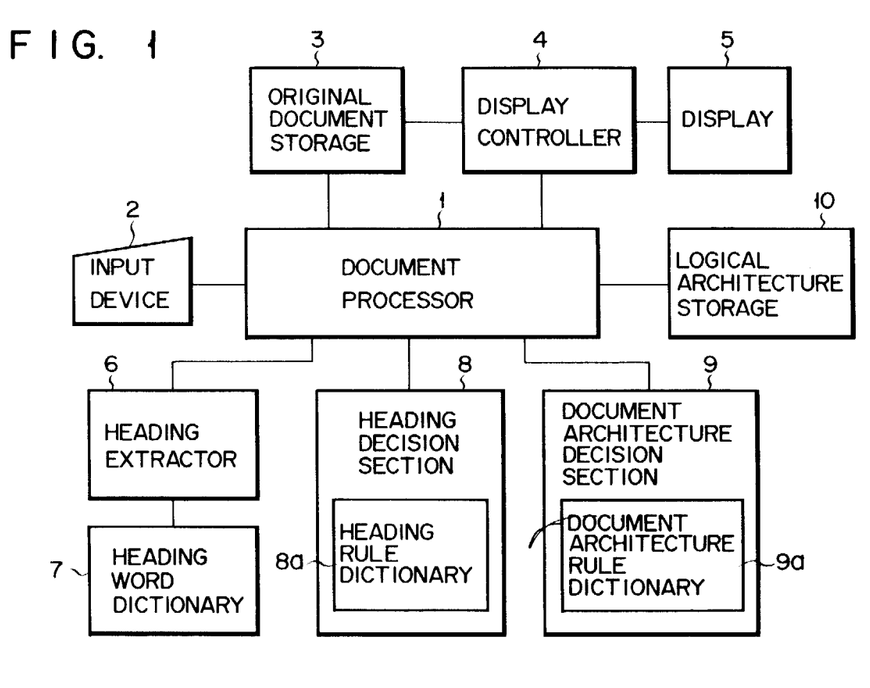
FIG. 1 is a block diagram of a document processing apparatus according to an embodiment of the present invention.

Document processor 1 is connected to input device 2 including a keyboard to perform centralized handling and processing of input documents. Document processor 1 is also connected to original document storage 3 for storing input original documents and to display controller 4 for causing display 5 to display the input original document read out from storage 3. Document processor 1 is further connected to heading extractor 6, heading decision section 8, document architecture decision section 9, and logical architecture storage 10. Heading extractor 6 is connected to heading word dictionary 7 for storing many types of words representative of headings. Heading decision section 8 includes heading rule dictionary 8a. Document architecture decision section 9 includes document architecture rule dictionary 9a.

Document processor 1 sequentially detects document data segmentation codes stored in storage 3, for example, a line return code, and extracts sentences segmented by the segmentation code. In this case, processor 1 measures each sentence length. The extracted sentences are sequentially sent to extractor 6. Extractor 6 decides the heading word from comparison of the input sentence with heading words stored in heading word dictionary 7, and the sentence length.

Figure 3:
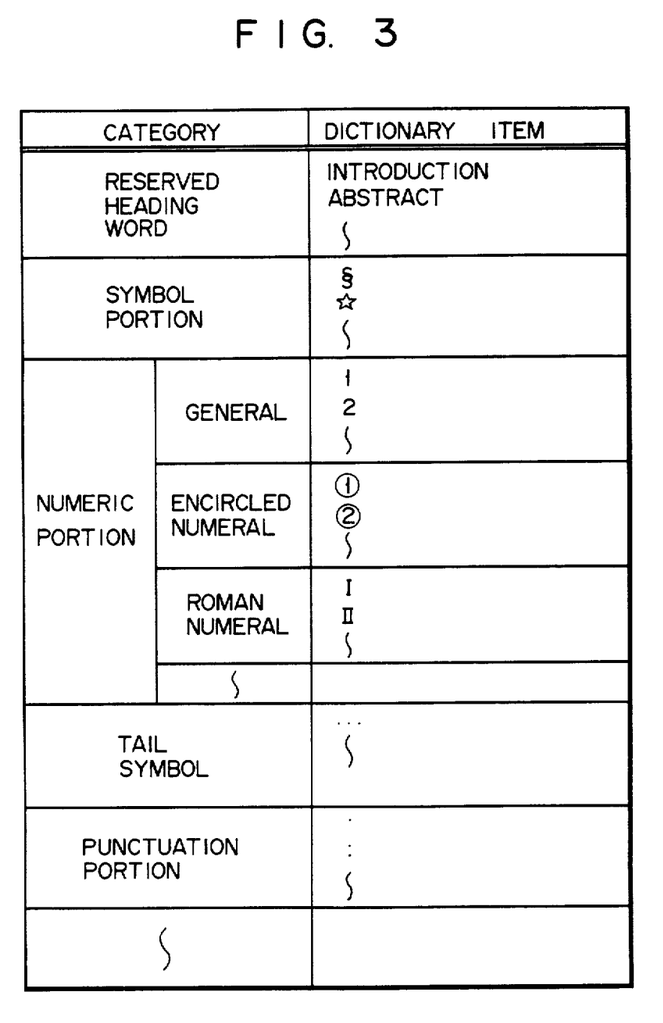
FIG. 3 is a table showing a rule of a heading word dictionary.
Figure 4A:
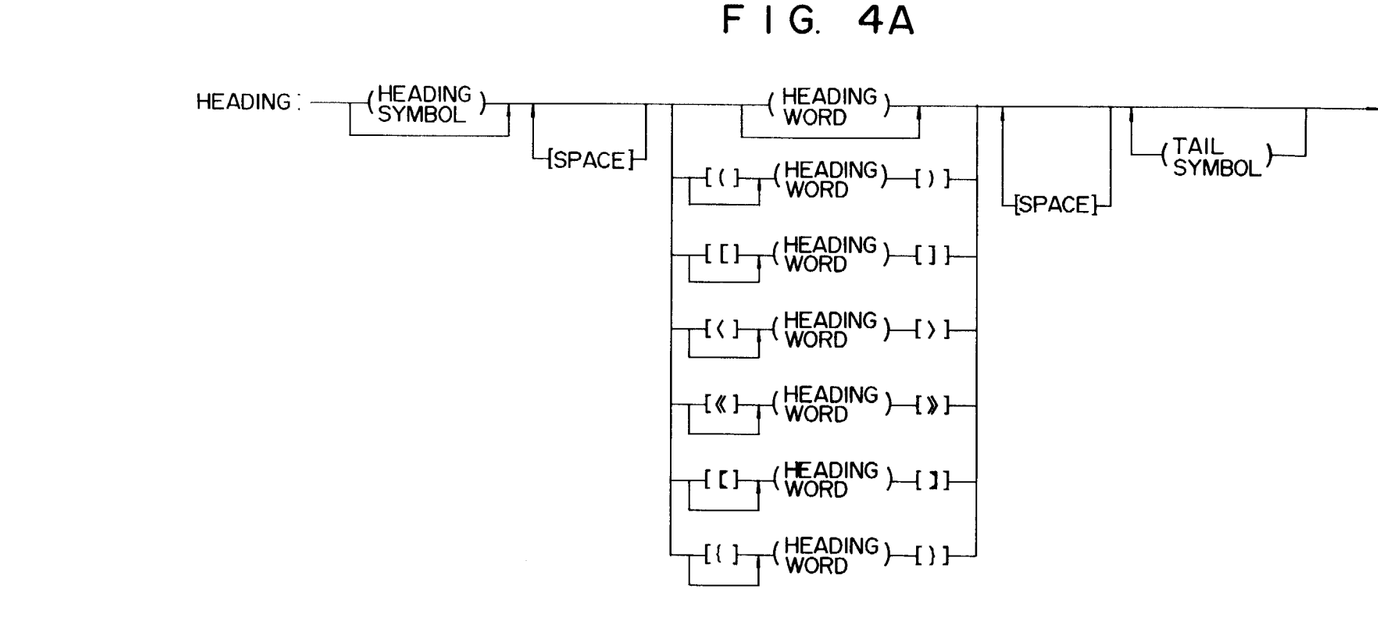
FIGS. 4A, 4B, 4C, and 4D are different diagrams showing heading rules, respectively.
Figure 4B:
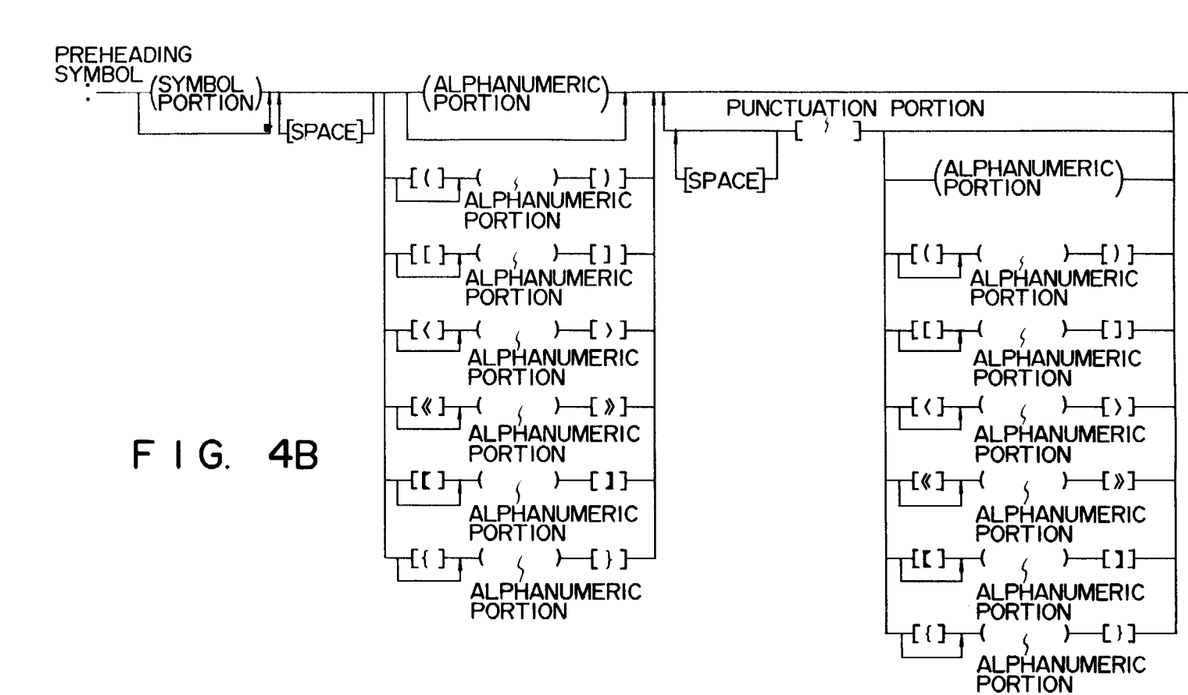
Figure 4C:
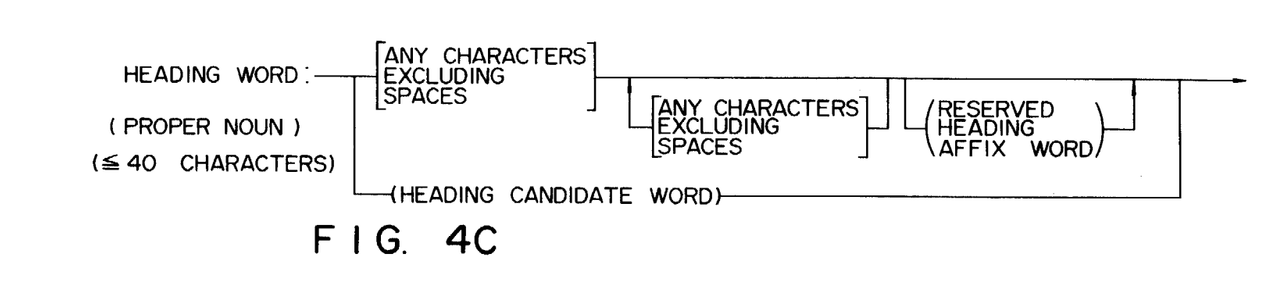
Figure 4D:
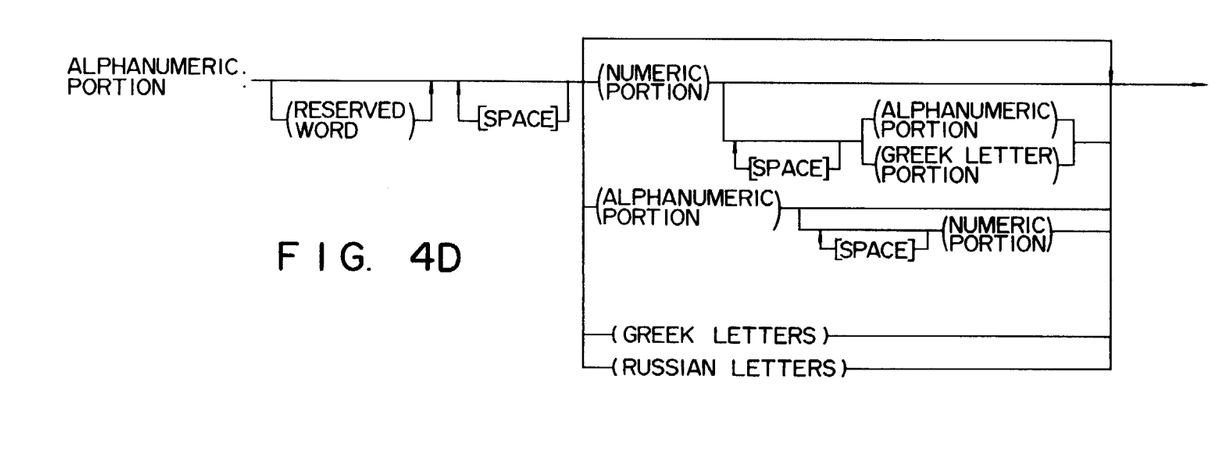

Heading word dictionary 7 stores frequently used words, phrases and symbols, all of which are defined as heading words. The words, phrases and symbols are classified into categories, as shown in FIG. 3, and are registered in advance in dictionary 7. Words such as "introduction" and "abstract" are registered in a category of "reserved heading word". In addition, frequently used numerals and symbols are also registered as heading words in the respective categories.

Heading extractor 6 decides whether the number of characters of an extracted sentence is less than a predetermined number. In other words, extraction section 6 decides whether a heading reserved word (a word and-/or phrase, and/or numeral and/or symbol represented as a code string) corresponds to a word registered in dictionary 7. If a correspondence is detected, the extracted word is recognized as the corresponding heading word.

The extracted words decided by extractor 6 as being the heading word are input, one by one, to heading rule dictionary 8a, under the control of processor 1. Decision section 8 decides, according to the heading rules (FIGS. 4A to 4D) stored in dictionary 8a, whether the reserved heading word is a heading word or another word.

The word discriminated as the heading word or any other word by heading decision section 8 is input to document architecture decision section 9 under the control of processor 1. Architecture decision section 9 decides whether the sentence or word from heading decision section 8 is a chapter heading, a section heading, or a paragraph, according to the document architecture rules (shown below) stored in dictionary 9a:

TABLE 1

Rules for Heading

| | |
|---|---|
| Condition 1 | does not include a reserved word. |
| Condition 1-1 | includes a heading word. |
| Condition 1-1-1 | includes a reserved heading word. |
| Condition 1-1-1-1 | does not include a chapter heading in the subsequent part. |
| (Result) | indicates a chapter heading. →A symbol portion, an alphanumeric portion, a punctuation portion, or a tail symbol is defined as a heading pattern. |
| Condition 1 + Condition 1-1, Condition 1-1-2 | does not include a reserved heading word. |
| Condition 1-1-2-2 | indicates that a chapter heading is present in the subsequent part. |
| Condition 1-1-2-2-1 | indicates that matching with a chapter heading pattern is successful. |
| (Result) | indicates a chapter heading. →The order of the chapter heading pattern is incremented by one. |
| Condition 1 + Condition 1-1 + Condition 1-1-2 + Condition 1-1-2-2, Condition 1-1-2-2-2 | this heading pattern does not match the previous chapter heading. |
| Condition 1-1-2-2 | an itemized pattern is not present in the subsequent part. |
| (Result) | indicates an itemized pattern candidate. |
| Condition 1 + Condition 1-1 + Condition 1-1-2 + Condition 1-1-2-2 +, Condition 1-1-2-2-2, Condition 1-1-2-2-2-2 | indicates that an itemized pattern candidate is present the subsequent part. |
| Condition 1-1-2-2-2-2-1 | this heading pattern matches the previous itemized pattern candidate. |
| (Result) | indicates an itemized pattern. The order of the itemized pattern is incremented by one. |

TABLE 2

Rules for Matching with Heading Patterns

| | |
|---|---|
| Condition 1-1 | includes an alphanumeric portion. |
| Condition 2-1 | alphanumeric portions are the same kind. |
| Condition 3-1 | the order of the alphanumeric portion is higher by one than that of a heading pattern. |
| Condition 4-1 | a symbol portion, factors excluding the order of an alphanumeric portion, a punctuation portion, a tail symbol, and the presence/absence of parentheses in the heading word are the same as those of the heading pattern. |
| (Result) | indicates success matching. |

TABLE 2-continued

Rules for Matching with Heading Patterns

| | |
|---|---|
| Condition 1-1 + Condition 2-1 + Condition 3-1, Condition 4-2 | a symbol portion, factors excluding the order of an alphanumeric portion, a punctuation portion, a tail symbol, and the presence/absence of parentheses in the heading word are the same within the range of the error pattern rules. |
| (Result) | indicates success matching. |
| Condition 1-1 + Condition 2-1 + Condition 3-1, Condition 4-3 | a symbol portion, factors excluding the order of an alphanumeric portion, a punctuation portion, a tail symbol, and the presence/absence of parentheses in the heading word are not the same as those of the heading pattern. |
| (Result) | indicates failure matching. |
| Condition 1-1 + Condition 2-1, Condition 3-2 | the order of the alphanumeric portion is equal to or incremented by two from the order of the heading pattern. |
| Condition 4-1 | a symbol portion, factors excluding the order of an alphanumeric portion, a punctuation portion, a tail symbol, and the presence/absence of parentheses in the heading word are the same within the range of the error pattern rules. |
| (Result) | indicates success matching. |
| Condition 1-1 + Condition 2-1 + Condition 3-2, Condition 4-2 | a symbol portion, factors excluding the order of an alphanumeric portion, a punctuation portion, a tail symbol, and the presence/absence of parentheses in the heading word are not the same as those of the heading pattern. |
| (Result) | indicates failure matching. |
| Condition 1-2 | does not include an alphanumeric pattern. |
| Condition 2-1 | indicates that a symbol portion, factors excluding the order of an alphanumeric portion, a punctuation portion, a tail symbol, and the presence/absence of parentheses in the heading word are the same as those of the heading pattern. |
| (Result) | indicates success matching. |
| Condition 1-2, Condition 2-2 | a symbol portion, factors excluding the order of an alphanumeric portion, a punctuation portion, a tail symbol, and the presence/absence of parentheses in the heading word are not the same as those of the heading pattern. |
| (Result) | indicates failure matching. |

TABLE 3

Paragraph Associated Format

| | |
|---|---|
| Condition 1-1 | does not include a heading. |
| (Result) | indicates a paragraph. |

TABLE 4

Conjunction Associated Format

| | |
|---|---|
| Condition 1-1 | a paragraph. |
| Condition 2-1 | the previous sentence is not an itemized pattern formula. |
| (Result) | indicates that the level of the current heading is set to be the same as one of the previous sentence. |
| Condition 1-1, | the previous sentence is pat- |

TABLE 4-continued

| Conjunction Associated Format | |
| --- | --- |
| Condition 2-2 (Result) | tern formula. sets the level as [(level of the previous sentence) − 1]. |

The logical architecture of a sentence or word, as determined by decision section 9 according to the above rules, is stored in logical architecture storage 10.

Display controller 4 controls display 5 to display the document data according to the document logical architecture stored in logical architecture storage 10.

Figure 2:
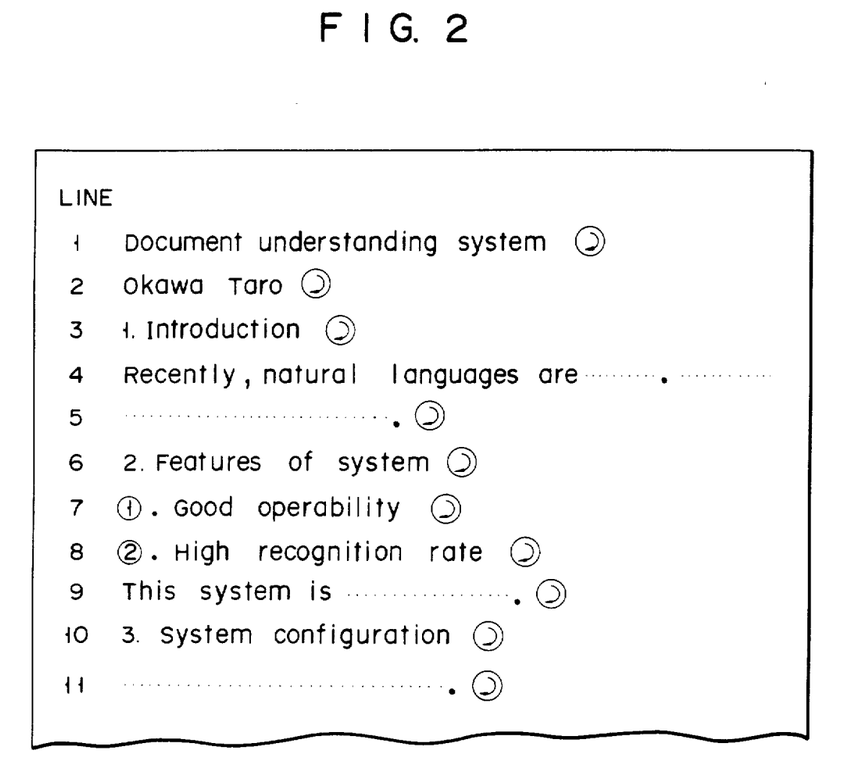
FIG. 2 is an input sentence having a hierarchy logical architecture.
Figure 5:
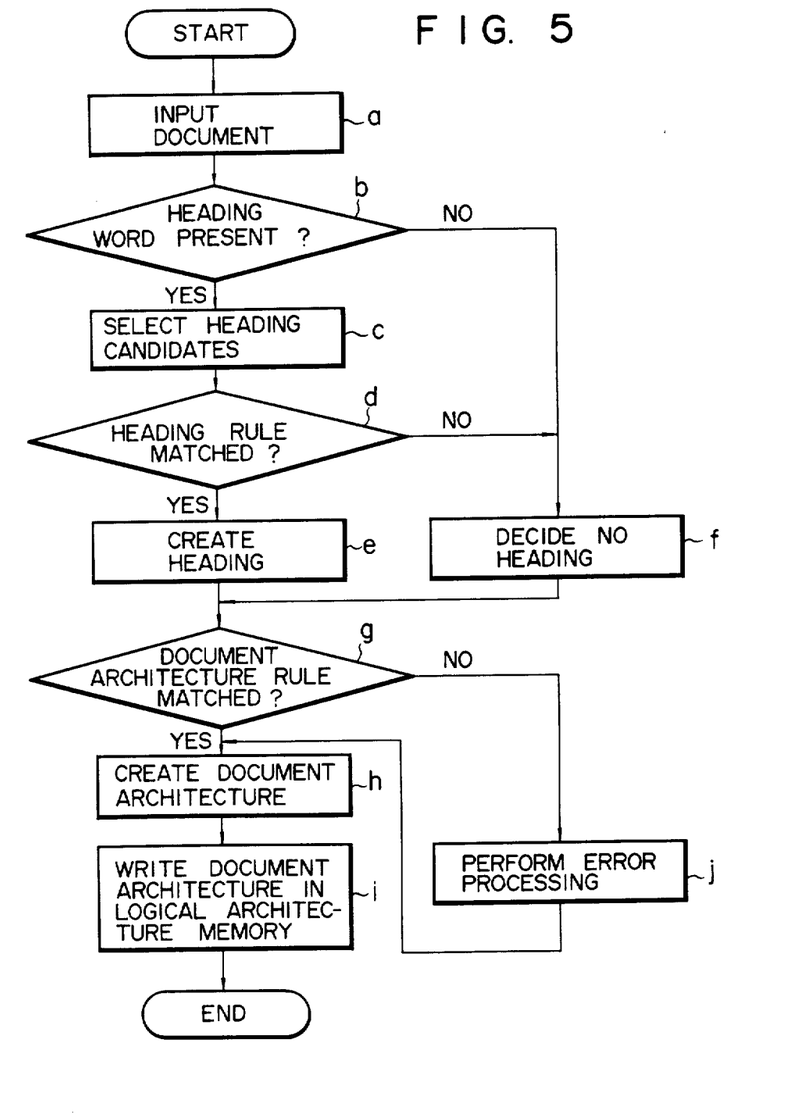
FIG. 5 is a flow chart for explaining the operation of the document processing apparatus.

The operation of the document processing apparatus will now be described with reference to the flow chart in FIG. 5. When document data is input at input device 2 (step a), input document data is sequentially stored in document storage 3. At the same time, the input document data is segmented into a plurality of blocks by document processor 1, as shown in FIG. 2. In segmentation processing, a line return code and a space code or segmentation symbol such as "...", ";", ",", or ":" are determined as segmentation codes. The input document data is segmented in units of blocks at the segmentation codes. In this case, the segmentation sentence length is measured by counting characters. If the measured value falls within a predetermined value (e.g., 40 characters), the sentence is determined as having the possibility of being a heading sentence.

If the segmented sentence is determined as having the possibility of being a heading sentence according to the measured number of characters, heading extractor 6 decides whether a character string (words, phrases, or symbols) constituting the segmented sentence is registered in heading dictionary 7 (step b). For example, when sentence "1. Introduction" in the input document data is extracted, it is checked as to whether it is registered in heading dictionary 7. In this case, "1" and "Introduction" are retrieved from heading dictionary 7, and the sentence is determined as being heading candidate A (step c).

When heading candidate decision is performed, heading decision section 8 accesses heading rule dictionary 8a to determine whether candidate A is a heading word (step d). If candidate A is defined by any one of the rules in FIGS. 4A to 4D, candidate A is determined as being heading word B (step e). In this case, the type of heading word is determined according to the applied heading rule.

If the sentence segmented by document processor 1 does not correspond to any heading word registered in dictionary 7, or if the segmented sentence does not coincide with any heading rule although it is determined as being a heading candidate word, the segmented sentence is determined as being a sentence rule not included in the heading word rules (step f).

The sentence determined as being a heading word, and the sentence determined as not being a heading word are input to document architecture decision section 9 in order to determine their document architecture. When the document architectures is determined, decision section 9 determines whether the sentence architectures correspond to document architecture rules (Tables 1 to 4) stored in rule dictionary 9a (step g). If the architecture of the input document is defined by one of the document architecture rules, document architecture data corresponding to the determined rule is stored in storage 10 (steps h and i).

However, if not, an error is present in the document architecture. As a result, error processing for the sentence, for example, correction of document data, is performed (step j).

In the segmented words in FIG. 2, the sentence of the first line, i.e., "document understanding system", and the sentence of the second line, i.e., "Okawa Taro" are not stored in dictionary 7. These sentences are decided by extractor 6 not to be heading words. However, the sentence of the first line is defined by a rule representing a noun phrase appearing at the head of the document, and decision section 9 decides that "document understanding system" is a title. The sentence of the second line, "Okawa Taro" is, a proper noun representing a person's name. Since the person's name follows the title, the name is determined as being an author's name.

Figure 6A:
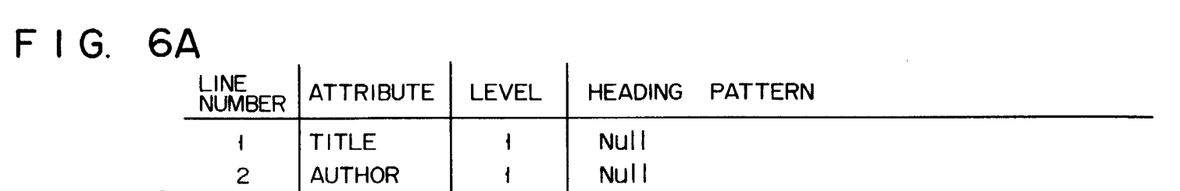
FIGS. 6A, 6B, 6C, 6D, and 6E are different tables showing document architecture rules, respectively.

The results obtained by the document architecture decision described above are stored in the form, as shown in FIG. 6A, in logical architecture storage 10.

In the sentence of the third line, i.e., "1. Foreword", three words, i.e., "1", ".", and "Introduction" are stored in dictionary 7. Therefore, this sentence is determined as being heading candidate sentence A1. At the same time, the categories constituting this sentence are recognized as a numeric portion, a tail portion, and a heading candidate word, respectively.

Heading decision section 8 accesses rule dictionary 8a to determine whether the sentence determined as being heading candidate A1 is defined by the heading rules. In this case, the order of the categories constituting candidate word A1 is analyzed. Decision section 8 determines whether the order satisfies any one of the conditions in FIGS. 4A to 4D. The first numeral "1" is defined by the rule in FIG. 4D. The numeral "1" and tail portion "." are defined by the rule in FIG. 4B. Therefore, "1." is determined as being a heading symbol according to the rule in FIG. 4B. "Introduction" is defined by the rule in FIG. 4C, and is determined as being a heading word. The relationship between the heading symbol and the heading word is defined by the rule in FIG. 4A. Heading candidate A1 is thus decided as heading B1. The above decision process is shown in FIG. 8A.

In the above decision process, if the categories are not defined by the rules in FIGS. 4A to 4D, heading candidate A1 is determined as not being a heading word.

Figures 6B, 6C:
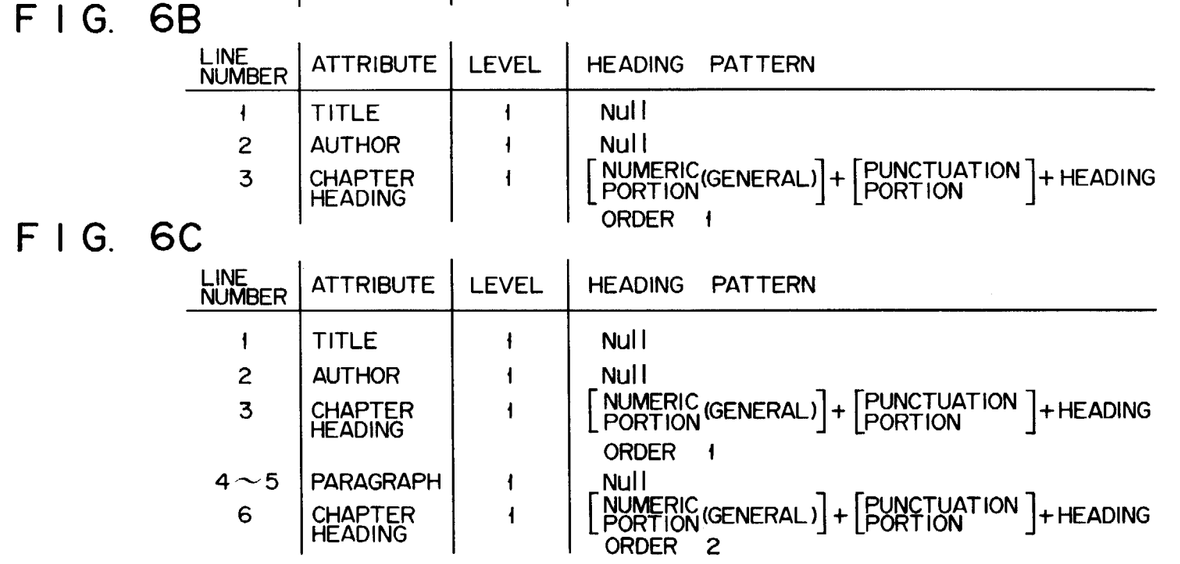

Document architecture decision section 9 determines the document architecture of heading B1 according to the rules in Tables 1 to 4. In this case, the logical architecture of the analyzed sentence is stored in storage 10, as shown in FIG. 6B. No chapter heading is indicated in the stored logical architectures. Heading B1, i.e., "1. Introduction" is defined by conditions (1), (1-1), (1-1-1), and (1-1-1-1) in Table 1 so that "1. Introduction" is determined constituting chapter heading C1. According to this decision, the logical architecture containing the chapter heading is stored in logical architecture storage 10, as shown in FIG. 6B.

Since the number of characters of the sentence of the fourth and fifth lines exceeds the number for determining the possibility of a sentence being a heading word, this sentence is therefore determined as being other than a heading. As defined by the rule in Table 3, the sentence of the fourth and fifth lines is determined as being a sentence constituting a paragraph.

Figure 7A:
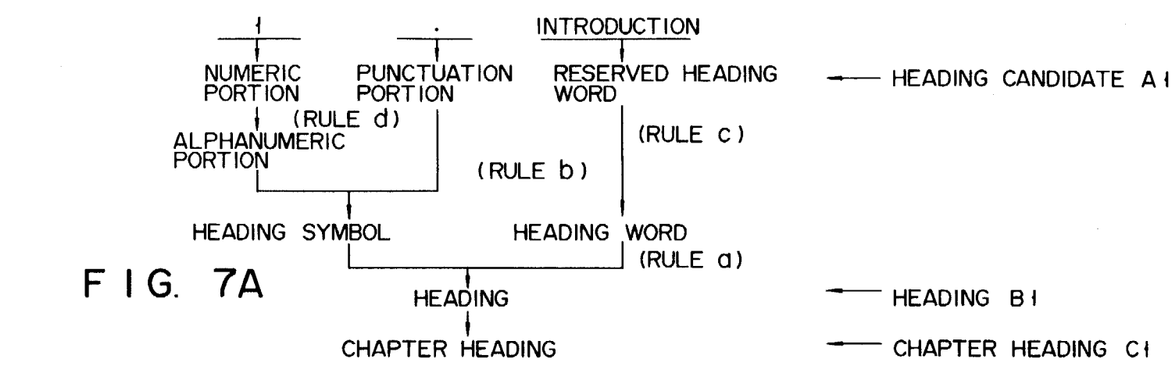
FIGS. 7A, 7B, and 7C are different diagrams for analyzing document rules, respectively.
Figure 7B:
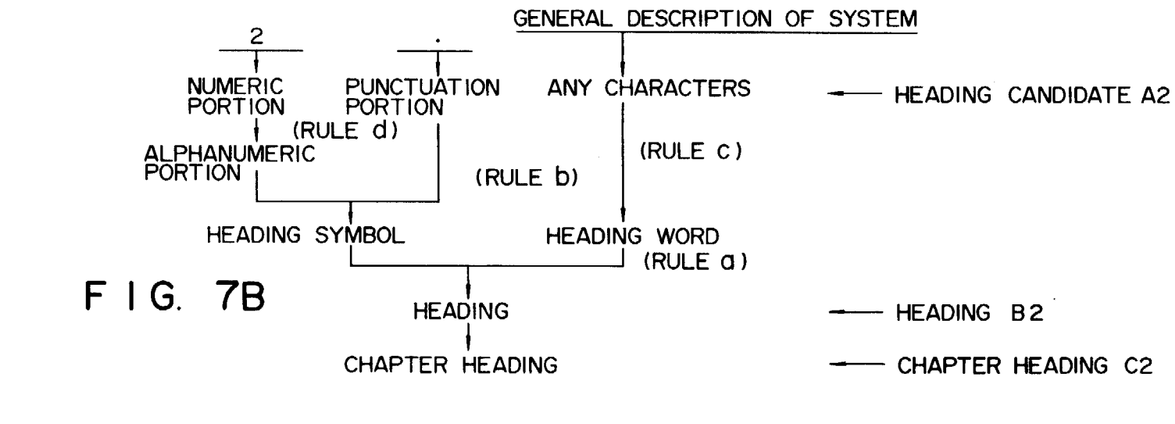

The sentence of the sixth line is recognized as heading candidate A2 in the same procedures as for heading candidate A1. In this case, the sentence of the sixth line is analyzed by the steps in FIG. 7B and is determined as being heading B2. The chapter heading data in FIG. 6B is stored in storage 10. Heading B2 is compared with the rules in Table 2 to determine it coincides with a specific one of the rules. Heading B2 is defined by conditions (1-1), (2-1), (3-1), and (4-1), and is determined as having the possibility of being of the same level as that of chapter heading C1. In this way, it is determined whether heading B2 is defined by the rules in Table 1. In other words, "2. Features of System" satisfies conditions (1), (1-1), (1-1-2), and (1-1-2-2-1), and thus, heading word B2 is determined as constituting chapter heading C2. The resultant logical architecture data is stored in storage 10 as shown in FIG. 6C.

Figure 6D:
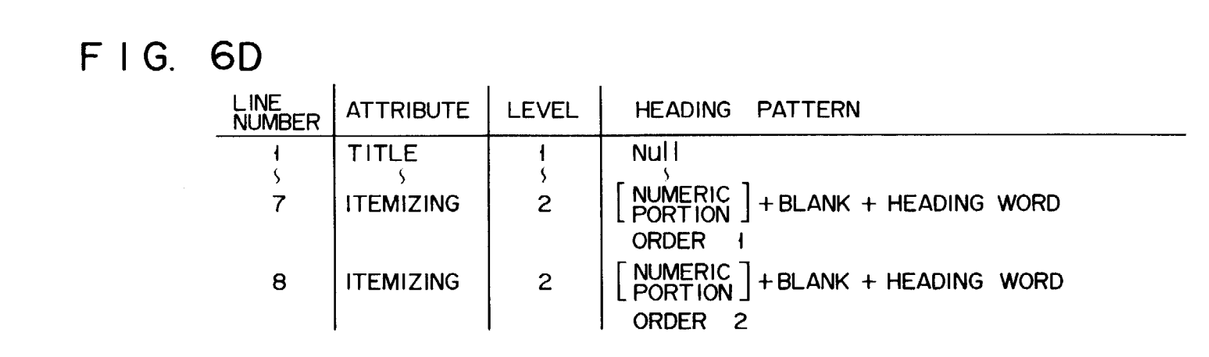
Figure 6E:
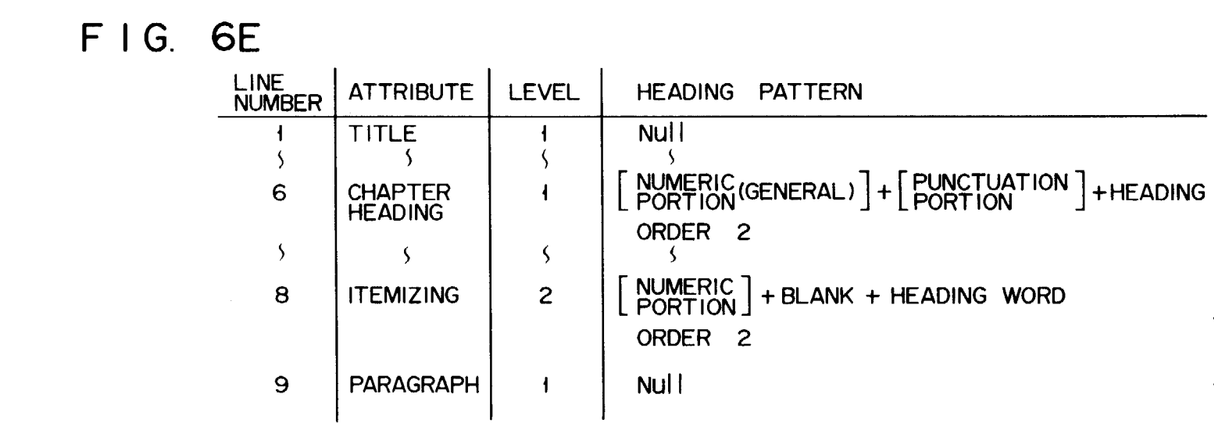
Figure 7C:
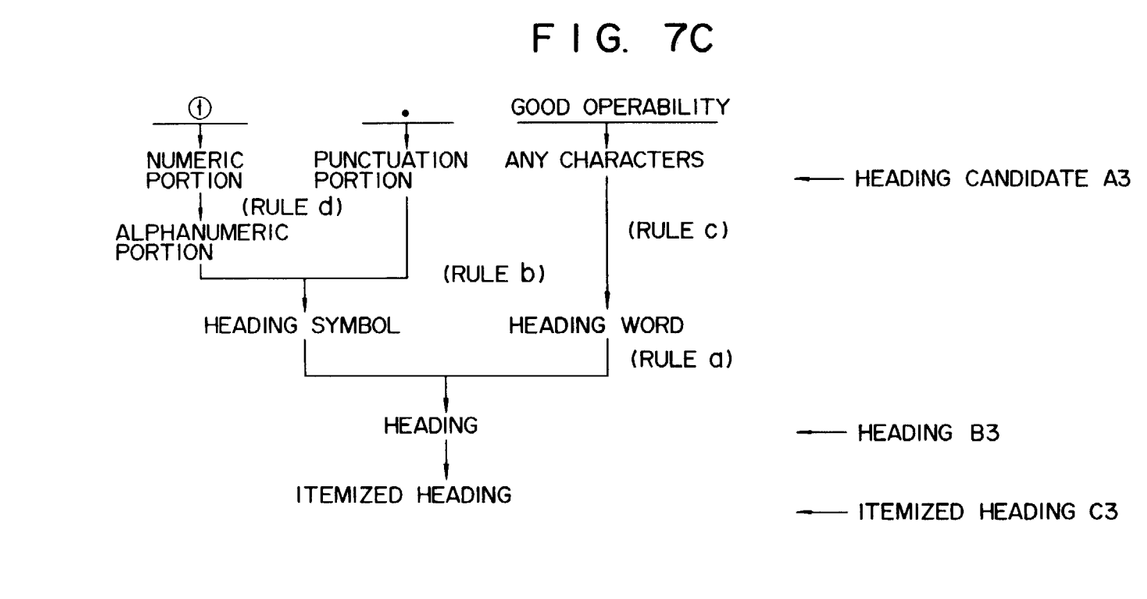

The same processing as described above is performed for the sentences of the seventh and subsequent lines, and the document architectures of these sentences are stored in storage 10, as shown in FIGS. 6D and 6E. More specifically, for the sentence of the seventh line, heading candidate A3 is analyzed, as shown in FIG. 7C, and then is determined as being heading B3 according to the rules in FIGS. 4A to 4D.

In document architecture decision section 9 heading B3 is compared with the rules in Table 2. Since the pattern of heading B2 does not previously appear, matching is unsuccessful. As a result, heading B3 is determined as being a heading having a level different from those of the previous headings. Heading B3 is checked according to document architecture rules in Table 1 and is found to coincide with conditions (1), (1-1), (1-1-2), (1-1-2-2), and (1-1-2-2-2-1). Therefore, heading B3 is determined as being itemizing heading C3.

Similarly, since the sentence of the eighth line satisfies conditions (1-1), (2-1), (3-1), and (4-1), the level of the heading corresponding to the sentence of the eighth line is determined as being possibly the same as that of the itemized heading. The sentence of the eighth line is determined as satisfying conditions (1), (1-1), (1-1-2), (1-1-2-2), (1-1-2-2-2), (1-1-2-2-2-2), and (1-1-2-2-2-2-1) in Table 1.

If a paragraph is detected, the correspondence between the paragraph and the level of the heading must be determined. By referring to the rule in Table 4, the conjunctional relationship between the paragraph and the heading is determined so that the paragraph level can be decided. If the sentence of the fourth line is input, the sentence immediately preceding the paragraph is a chapter heading and satisfies conditions (1-1) and (2-1) in Table 4. The level of this sentence is set to be the same (level 1) as the chapter heading, as shown in FIG. 6C.

For the sentence of the ninth line, a paragraph is found next to the itemized heading. The sentence of the ninth line satisfies conditions (1-1) and (2-2) in Table 4. Therefore, its level is set, as shown in FIG. 6E.

According to the present invention as described above, the input document data is segmented in units of sentences, and it is determined whether each sentence constitutes a heading. At the same time, the document rule of each sentence is decided. Therefore, the input document data can be effectively processed according to the logical document architectures.

The document processing described above is performed effectively. In other words, the heading, the level (hierarchical level) of the heading in the document, and the document architecture, such as the paragraphs preceded by the heading, are obtained effectively according to the input document data. It is thus possible to process the document in units of chapters or sections according to the logical architectures thereby greatly improving and simplifying document processing.

Figure 8:
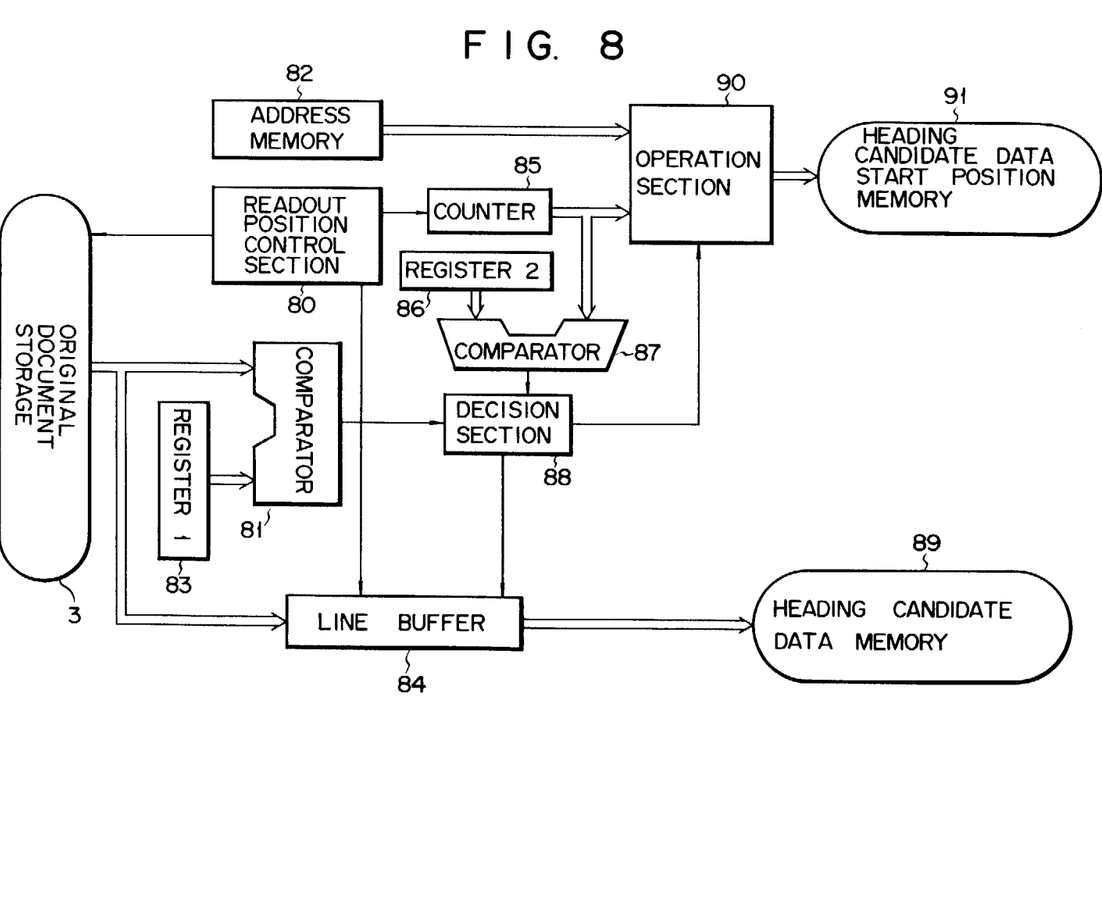
FIG. 8 is a block diagram of a heading extraction section.

FIG. 8 shows a block diagram of the heading extractor 6. In this circuit, document data is sequentially input from original document storage 3 to comparator 81 in response to a readout position signal from readout position designation section 80. In this case, the position of each character in the document is stored in address memory 82. Comparator 81 compares input sentence data with a line return code stored in register 83. The input sentence data is input to line buffer 19 and stored in line buffer 84 in response to a position signal from readout position control section 80. The number of the characters stored in line buffer 84 is counted by counter 85 in response to the signal from control section 80. If a line return code appears in the character data, the count of counter 85 is compared, by comparator 87, with a value stored in register 86. Data representing a predetermined one-line sentence, for example, 40 characters, is stored in register 86. If the count of counter 85 coincides with the reference value of register 86, an output from comparator 87 is input to decision section 88. If the output from comparator 87 is supplied together with the line return code from comparator 81 to decision section 20, or the line return code is supplied thereto prior to the output from comparator 87, decision section 20 determines the input sentence data as being a heading candidate. Decision section 88 supplies a signal based on this decision to line buffer 84. Line buffer 84 stores the input sentence data as heading candidate data in heading candidate data memory 89, in response to the decision signal from decision section 88. In this case, the count of counter 85 is subtracted by operation section 23 from the content of address memory 82. The resultant difference derives a start address of line buffer 84. The start address is input to heading candidate data start position memory 91. In this case, line buffer 84 and counter 85 are reset to the initial state. Therefore, heading extractor 6 is set to the initial state so as to extract the next sentence.

If a coincidence between the count of counter 85 and the reference value of register 86 occurs prior to generation of the line return code, the data stored in line buffer 84 is determined as not being a heading word. Line buffer 84 and counter 85 are reset to the initial state. In this state, the extraction operation for the next input sentence data can be performed.

If document data has been completely processed during the heading extraction routine, the heading decision routine is executed by heading decision section 8. This routine is performed by a circuit in FIG. 9. The heading candidate data from heading candidate data memory 89 is input to comparator 92 and is sequentially compared with the decision rules stored in heading rule dictionary 8a. The comparison results of comparator 92 are sequentially input to decision section 93. Decision section 93 determines conditions for defining heading candidate data as true heading words.

Figure 9:
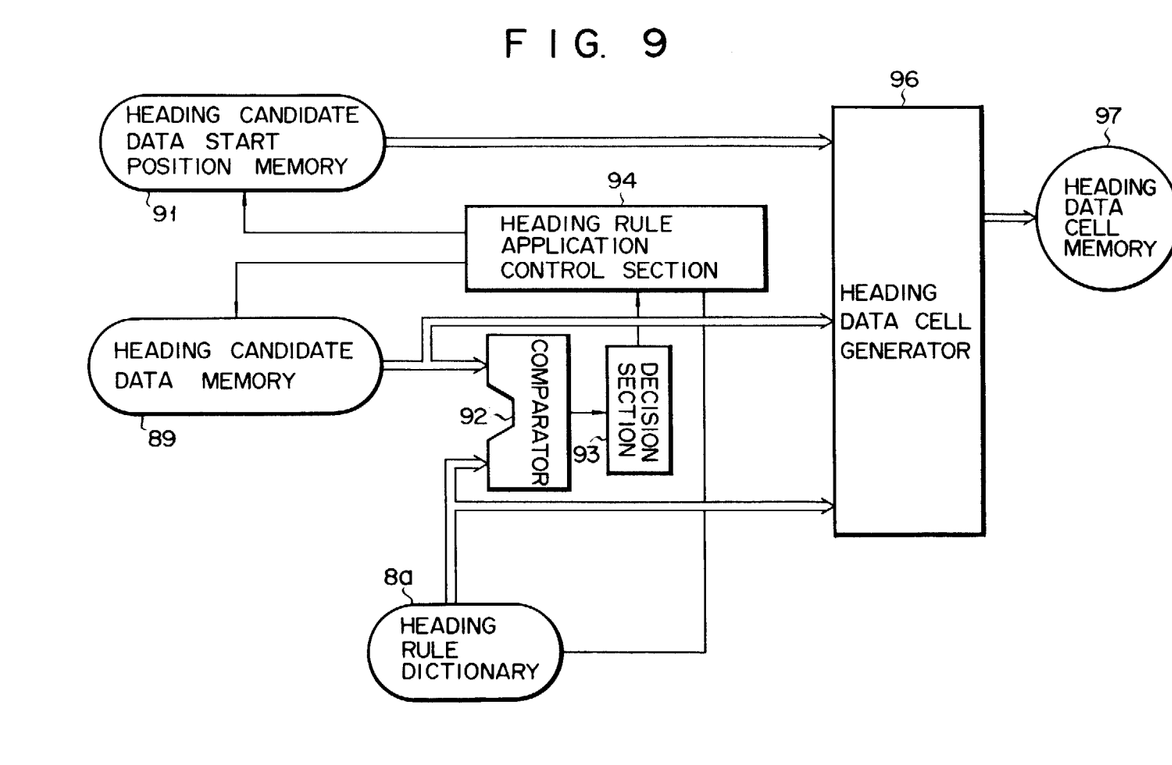
FIG. 9 is a block diagram of a heading decision section.

If decision section 93 determines that heading candidate data satisfies all conditions, heading rule application control section 94 determines that the candidate data is a true heading word. By this decision, heading candidate data memory 89 reads out the candidate word data decided as the true heading word and supplies it to heading data cell-shaping section 96.

Shaping section 96 forms a heading cell every heading decision. If numerals or letters are determined as being a heading, the numerals are ordered according to their values, or the letters are ordered alphabetically. For example, if a heading symbol is "Chapter 2", its ordinariness is 2. The data cell obtained in the manner described above is stored in heading data cell memory 97.

According to the present invention, the logical architectures such as chapters, sections, items, and paragraphs are obtained from the input document data. Therefore, document processing can be performed effectively according to these logical architectures.

What is claimed is:

1. A document generating apparatus comprising:
   means for inputting document data;
   heading dictionary storing means for storing words and phrases frequently used as headings, said headings being arranged in a column direction;
   heading candidate extraction means for extracting as heading candidate particular words and phrases of said words and phrases stored in said heading dictionary storing means, said heading candidate extraction means connecting to said heading dictionary storing means, said heading candidate extraction means connecting to said means for inputting document data;
   heading rule dictionary means for storing rules which are used to determine said headings, said heading rule dictionary means connecting to a heading deciding means;
   said heading deciding means connecting to said heading candidate extracting means, said heading deciding means being used to check said heading candidate extraction means according to said rules stored in said heading rule dictionary means, said heading deciding means deciding whether said heading candidate is a suitable heading;
   document architecture rule dictionary means for storing rules associated with document logical architecture, said document architecture rule dictionary means being connected to a document architecture deciding means; and
   said document architecture deciding means being used for deciding a document logical architecture of said headings, said document architecture deciding means comparing relations between said headings and comparing a relation between said headings and at least one non-heading in accordance with said rules associated with document logical architecture stored in said document architecture rule dictionary means, said headings and said at least one non-heading being decided by said heading deciding means, said document architecture deciding mean being connected to said heading deciding means.

2. An apparatus according to claim 1, wherein:
   said document architecture rule dictionary means comprises a memory for storing document logical rules in units of document fields of interest.

3. An apparatus according to claim 1, wherein:
   said document architecture rule dictionary means comprises means for storing a plurality of rules representing hierarchical document logical architectures such as a chapter, a section, an itemized sentence, and a paragraph.

4. An apparatus according to claim 1, wherein:
   said heading candidate extraction means comprises doc memory means for storing all document data input at said input means, and means for detecting segmentation codes from the document data stored in said document memory means and extracting the document data in units of segmentation codes.

5. An apparatus according to claim 4, wherein:
   said heading candidate extraction means comprises counting means for counting the length of the document read out from said document data having a predetermined length counted by said counting means, as the heading candidate.

6. An apparatus according to claim 1, wherein:
   said document architecture deciding means is means for deciding a heading decided by said heading deciding means as a chapter heading and an item heading.

7. An apparatus according to claim 6, wherein:
   said document architecture decision means includes means for determining an architecture level of said chapter heading and said item heading.

8. An apparatus according to claim 1, wherein:
   said document architecture deciding means includes means for determining a noun phrase appearing at a document's head as a title.

9. An apparatus according to claim 8, wherein:
   said document architecture deciding means includes means for determining a person's name following the title as an author's name.

10. An apparatus according to claim 1, wherein:
    said document architecture deciding means includes means for determining a sentence having no heading as a paragraph.

11. An apparatus according to claim 7, wherein:
    said document architecture deciding means includes means for determining a conjunctional relationship between a paragraph and the heading decided by said heading deciding means and for determining a paragraph level according to an architecture level.

12. An apparatus according to claim 10, wherein:
    said document architecture deciding means includes means for determining a conjunctional relationship between a paragraph and a heading decided by said heading deciding means and for determining a paragraph level according to an architecture level.

* * * * *